UNITED STATES PATENT OFFICE.

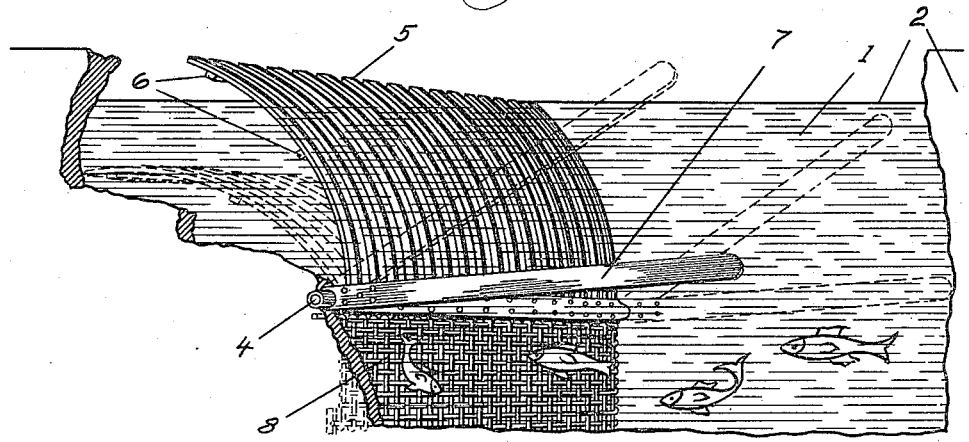
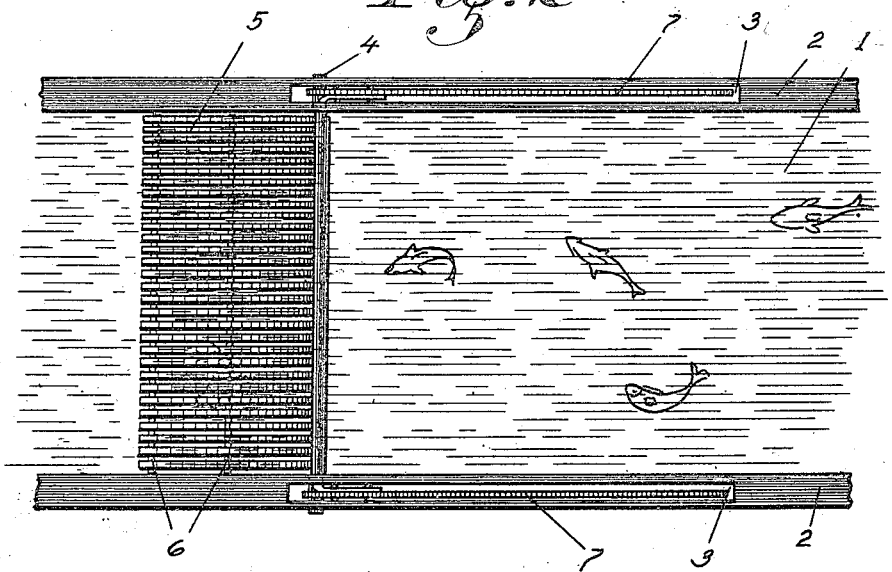

WILLIAM D. BLUDWORTH, OF SACRAMENTO, CALIFORNIA.

FISH-SCREEN.

1,262,007.

Specification of Letters Patent.

Patented Apr. 9, 1918.

Application filed February 7, 1917. Serial No. 147,230.

*To all whom it may concern:*

Be it known that I, WILLIAM D. BLUDWORTH, a citizen of the United States, residing at Sacramento, in the county of Sacramento, State of California, have invented certain new and useful Improvements in Fish-Screens; and I do declare the following to be a full, clear, and exact description of the same, reference being had to the accompanying drawings, and to the characters of reference marked thereon, which form a part of this application.

This invention relates to improvements in fish screens used for keeping fish from entering irrigation ditches, canals, power flumes and the like, the object of the invention being to provide a screen which will effectively hold the fish back and yet one which will automatically clear and free itself of all floating material or other obstructions which might tend to clog or obstruct the screen or the stream. A further object of the invention is to provide this automatic screening means of such construction as to do away with any complicated mechanism and one which will act solely through the simple action of gravity.

A still further object of the invention is to produce a simple and inexpensive device and yet one which will be exceedingly effective for the purposes for which it is designed.

These objects I accomplish by means of such structure and relative arrangement of parts as will fully appear by a perusal of the following specification and claim.

In the drawings similar characters of reference indicate corresponding parts in the several views.

Figure 1 is a view of a water way partly broken out and in section to show a perspective view of my improved fish screen.

Fig. 2 is a top plan view of the complete mechanism.

Referring now more particularly to the characters of reference on the drawings the numeral 1 designates the stream, ditch, canal or flume which it is desired to screen to prevent the fish from passing therethrough. In providing my improved invention I first build side walls 2 on each side of the water way 1, each side wall being provided with an elongated guide slot 3. In the walls 2 I journal a shaft 4 which extends completely across the path of the water way. Secured to the shaft 4 within the water way are a plurality of upwardly projecting grates or bars 5 arranged in spaced relation. The interstices between these members 5 are of sufficient width to allow a free flow of the water therethrough but to bar the passage of any fish in the water way. Such bars curve slightly in the direction in which the water is flowing and may be suitably braced together by cross bars 6 if desired or they may be made sufficiently strong to support themselves without the necessity of these bars 6.

The bars 5 are normally held in the position shown in Fig. 1 (which is the position in which they bar the passage of any fish through the water) by means of weights or bars 7 secured on the shaft 4 and normally extending into the slots 3. These members 7 are of such weight as to hold the bars 5 against the pressure of the water passing down the water way. When, however, any debris such as logs, drift wood or other similar matter collects against these bars 5 and tends to obstruct the water way, the added pressure occasioned thereby over-comes the weight of the member 7 and causes the bars 5 to move downwardly into the water. The shaft 4 is freely turnable to allow this action. As the bars 5 move downwardly in the water they lift the members 7 to the position shown by dotted lines in Fig. 1. The bars 5 then lie almost horizontally in the water way and the force of the water moving over the same clears off any of the obstructing material. This action is greatly aided by the slight curvature of the said bars 5 which allows them to be readily cleared. As soon as the over balancing material is cleared from the bars 5 the weight of the members 7 returns such bars back to normal vertical position.

The shaft 4 may be located directly at the bottom of the water way or if desired may be spaced a slight distance above such bottom and the intervening space may be filled with stationary screen 8. This structure however, is optional and in any event the screen 8 should only be of sufficient height to hold the shaft 4 above the possible level of any silt deposits which might tend to accumulate around the same and interfere with its free turning motion.

From the foregoing description it will be readily seen that I have produced such a device as substantially fulfils the object of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

A water way having a longitudinal slot formed in each wall, a turnable shaft extending across the water way and projecting into said slots, a screen on the shaft normally screening the water way, and counter weights fixed to the ends of the shaft within the slots and acting to maintain the normal vertical position of the screen.

In testimony whereof I affix my signature.

WILLIAM D. BLUDWORTH.

Copies of this patent may be obtained for five cents each, by addressing the "Commissioner of Patents, Washington, D. C."